Figure 1:
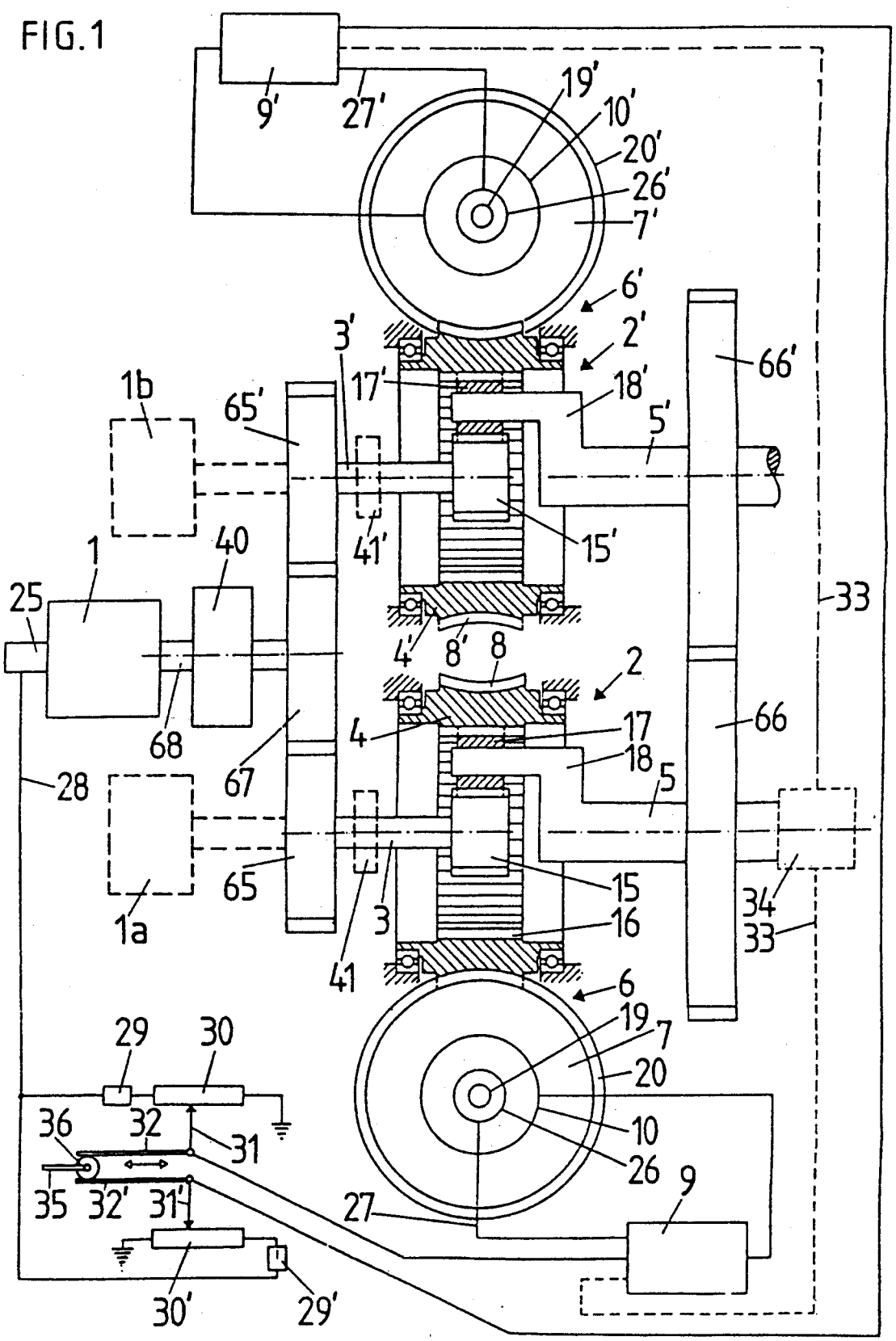

United States Patent [19]

Frey

[11] Patent Number: 5,033,996
[45] Date of Patent: Jul. 23, 1991

[54] CONTINUOUSLY VARIABLE DRIVE

[76] Inventor: Heinz Frey, Hirtenhofstrasse 18, CH-6005 Luzern, Switzerland

[21] Appl. No.: 490,567
[22] PCT Filed: Sep. 7, 1989
[86] PCT No.: PCT/CH89/00164
§ 371 Date: May 11, 1990
§ 102(e) Date: May 11, 1990
[87] PCT Pub. No.: WO90/02891
PCT Pub. Date: Mar. 22, 1990

[30] Foreign Application Priority Data

Sep. 12, 1988 [CH] Switzerland .......................... 3390/88

[51] Int. Cl.$^5$ .............................................. F16H 37/08
[52] U.S. Cl. ........................................ 475/204; 475/6; 475/199
[58] Field of Search ............... 475/199, 203, 204, 205, 475/6; 74/665 T

[56] References Cited

U.S. PATENT DOCUMENTS

| | | | |
|---|---|---|---|
| 1,329,319 | 1/1920 | Baker | 475/204 |
| 1,362,360 | 12/1920 | Starr | 475/204 |
| 4,784,017 | 11/1988 | Johnshoy | 475/6 |
| 4,819,512 | 4/1989 | Azuma et al. | 475/6 X |

FOREIGN PATENT DOCUMENTS 2415859 10/1975 Fed. Rep. of Germany .
2467332 4/1981 France .
607989 10/1948 United Kingdom .

Primary Examiner—Allan D. Herrmann
Assistant Examiner—William O. Trousdell
Attorney, Agent, or Firm—McGlew & Tuttle

[57] ABSTRACT

The drive comprises a drive motor (1), two differentials (2, 2'), two worm drives (6, 6'), two servomotors (10, 10'), as well as two control units (9, 9'). The drive motor (1) is connected to one input shaft (3, 3') each, the worm gears (8, 8') are each connected to another input shaft (4, 4') of the differentials (2, 2'), and the worms (7, 7') are connected to output shafts (19, 19') of the servomotors (10, 10'). The driving shafts (5, 5') of the differentials (2, 2') are coupled with one another so that they rotate in opposite directions. The control units (9, 9') control the servomotors (10, 10') so that at constant speed of the drive motor (1) the sum of speeds of the output shafts (19, 19') is constant. Due to this design, the driving shaft (5) is able to rotate in both directions of rotation at constant direction of rotation and constant direction of the drive torque acting on the drive motor, and the driving torque is able to act in both directions. The second servomotor (10') and, if need be, the second worm drive (6') may also be replaced with an additional differential.

10 Claims, 4 Drawing Sheets

CONTINUOUSLY VARIABLE DRIVE

The present invention pertains to a continuously variable drive, comprising a drive motor, a differential with a first input shaft and a second input shaft and a driving shaft, a worm drive with a worm and a worm gear, as well as a member with controllable speed, wherein the drive motor is connected to the first input shaft, the worm gear to the second input shaft, and the worm to an output shaft of the member with controllable speed.

Such a drive is known from West German Offenlegungsschrift No. DE-OS 24,15,859. In this prior-art drive, a motor drives a cage with radially oriented bevel gears via an angular reducing gear. The bevel gears mesh with two ring gears. One of said ring gears is connected to a driving shaft. A servomotor drives the other ring gear via a reducing worm drive. The worm drive is designed so that it is still just self-locking. At constant speed of the drive motor, the speed of the driving shaft can be controlled by varying the speed of the servomotor with a relatively low power consumption. However, the power consumption of the servomotor strongly depends on the speed and the speed control until, to the point where stoppage or even a reversed direction of rotation is possible only with a great reduction in the angular gear. Consequently, the maximum driving shaft speed is substantially lower than the speed of the drive motor.

This prior-art drive is suitable, for example, for capstan engines or cranes, i.e., for applications in which the driving torque always acts in the same direction.

The basic task of the present invention is to further improve a drive of the class described in the introduction so that the driving shaft can be both driven and decelerated in both directions of rotation.

This task is accomplished in that, the drive having a second differential with a third input shaft and fourth input shaft, the second and fourth input shafts are driven so that the sum of the speeds of the second and fourth input shafts is constant at constant speed of the first and third input shafts, and that the first driving shaft is coupled nonrotatably to the second driving shaft so that one of the two differentials delivers a driving torque on the first driving shaft in one direction of rotation and the other differential [delivers a driving torque] in the opposite direction of rotation at constant direction of rotation and constant direction of an input torque to the first and third input shafts.

Figure 2:
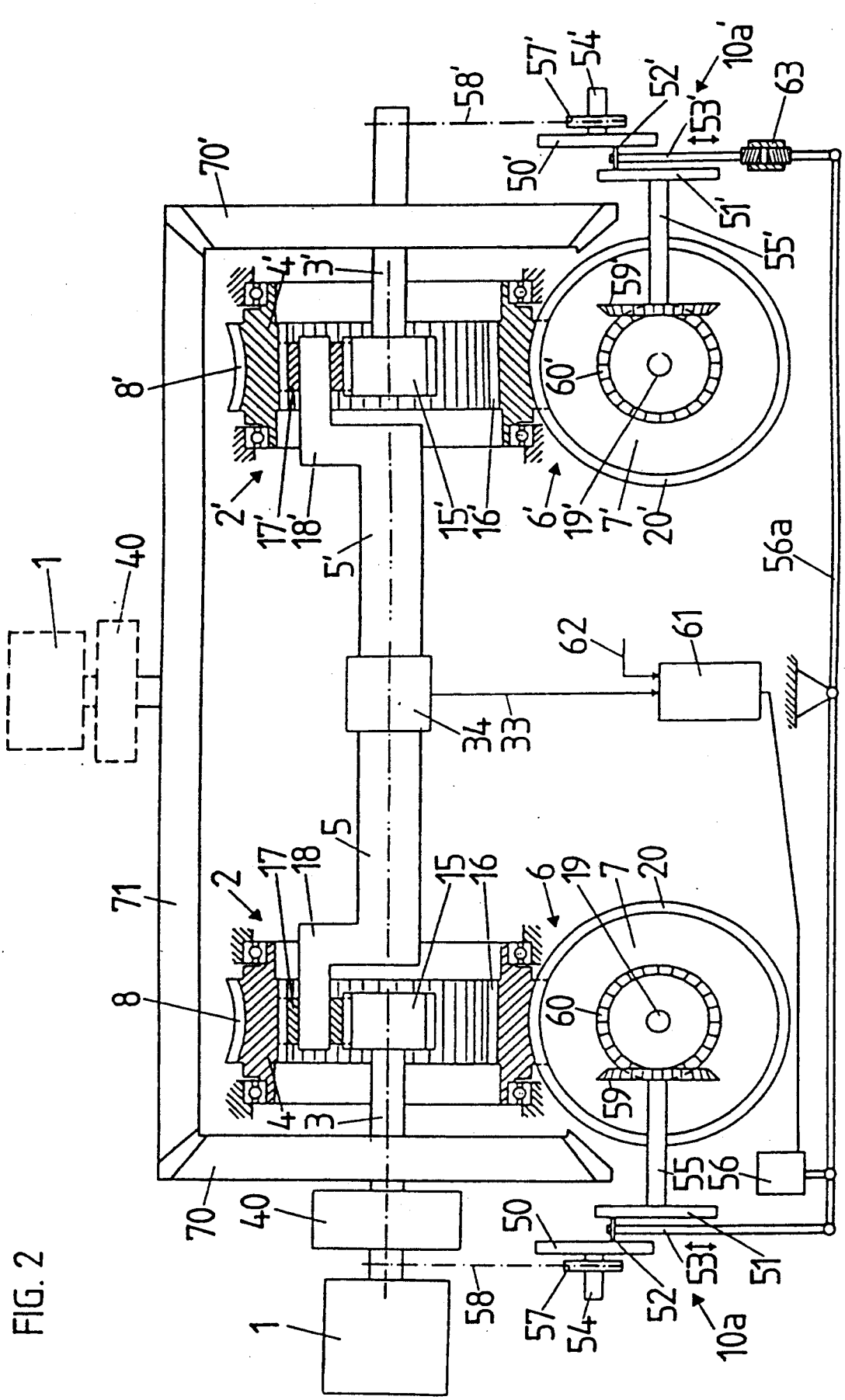
Figure 3:
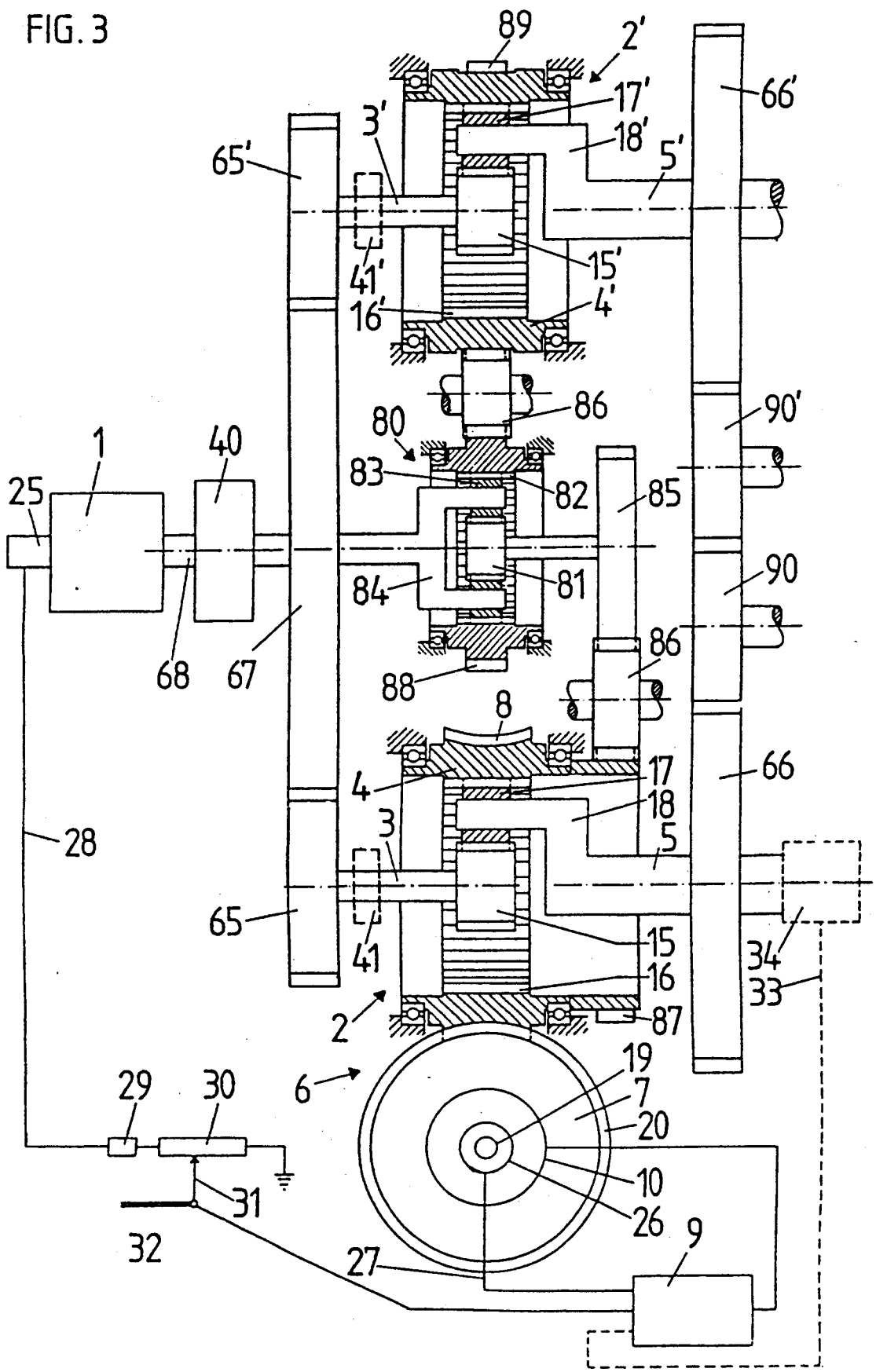
Figure 4:
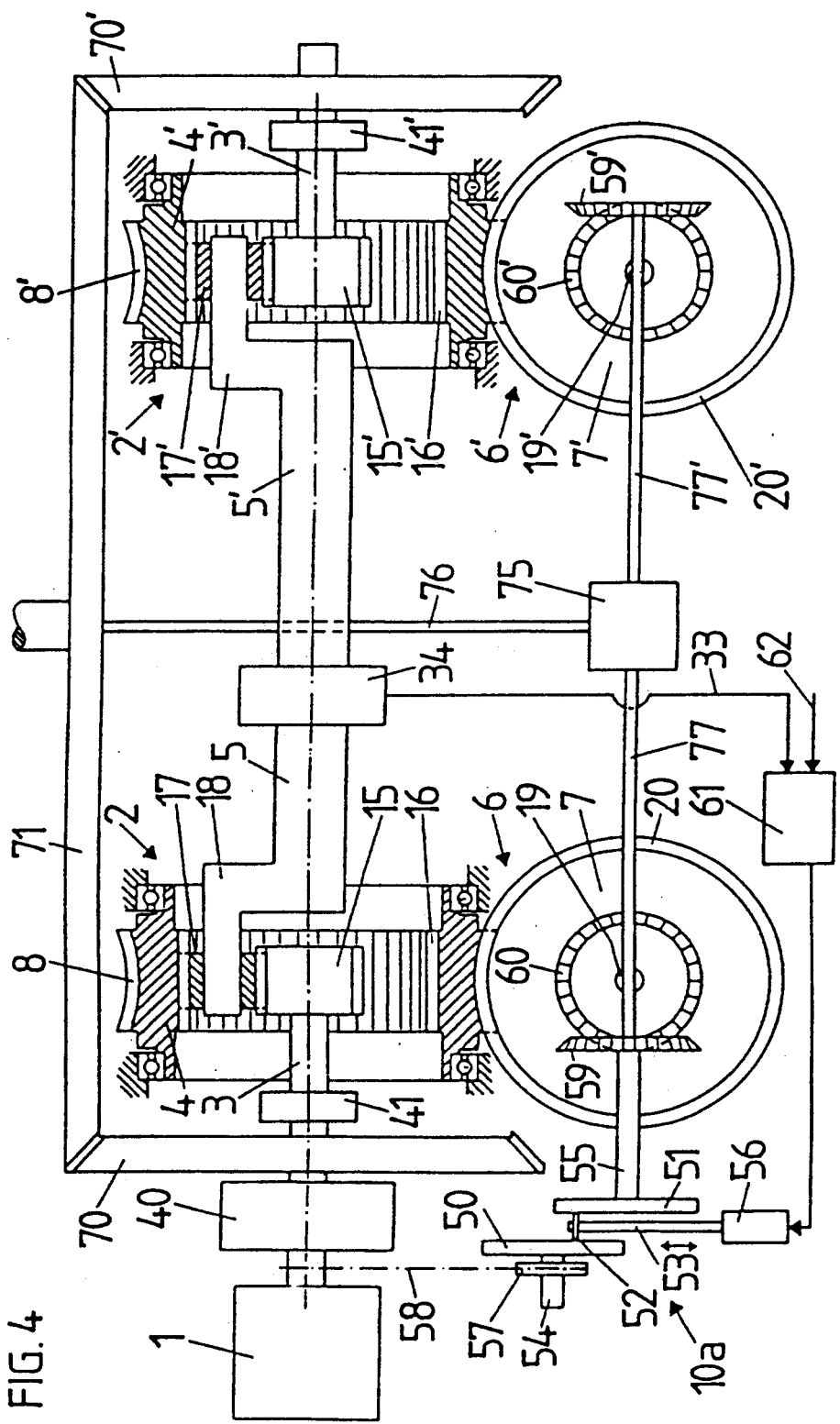

Embodiments of the present invention will be explained below on the basis of the drawing. Here, FIG. 1 shows schematically a first embodiment and FIGS. 2–4 show three other embodiments.

The drive according to FIG. 1 consists of a drive motor 1, two differentials 2 and 2', each with two input shafts 3, 4; 3', 4', and one driving shaft 5, 5', one worm drive 6, 6' with a worm 7, 7' and one worm gear 8, 8' connected to the respective shaft 4, 4', as well as a servomotor 10, 10' controlled by a control device 9, 9'. The two differentials 2, 2' are planetary drives and have a sun gear 15, 15' mounted on shaft 3, 3', a coaxial gear ring 16, 16' connected to said shaft 4, 4', as well as planetary gears 17 distributed over the circumference, of which only one is shown and which mesh with the respective sun gear 15, 15' and the respective toothed ring 16, 16'. The planetary gears 17, 17' are mounted rotatably on one pinion cage 18, 18' each. Said pinion cage 18, 18' is rigidly connected to the respective shaft 5, 5'. Said input shafts 3, 3' carry one gear 65, 65' each. Said two gears 65, 65' have equal number of teeth and mesh with a gear 67 mounted on the driving shaft 68 of said drive motor 1. Said input shafts 3, 3' are therefore driven by said motor 1 in the same direction and at equal speed.

Worm 7, 7' is mounted on said output shaft 19, 19' of the respective servomotor 10, 10'. The teeth of said worms 7, 7' have a pitch of between ca. 5° and ca. 9° and preferably ca. 7°. Said drive motor 1 has an impulse transmitter 25 for a revolution indicator and each servomotor 10, 10' has another impulse transmitter 26, 26' for a revolution indicator. The output 27, 27' of the respective impulse transmitter 26, 26' is connected to the control device 9, 9' associated with it. The output 28 of said impulse transmitter 25 is connected as a disturbance variable to one potentiometer 30, 30' each via one series resistor 29, 29' each, and the other sides of said potentiometers are grounded. The associated tap 31, 31' of said potentiometer 30, 30' is connected as a nominal value to the respective control unit 9, 9'. In the example show, said taps 31, 31' can be set by a member 32, 32' that can be actuated manually. Said members 32, 32' are connected to a common actuating rod 35 via a roller 36. Said roller 36 can be rotated and locked relative to said actuating rod 35. It is thus possible to slightly shift taps 31, 31' relative to one another. Said two potentiometers 30, 30' are connected in opposite direction, so that when said actuating rod 35 is moved, one servomotor 10 rotates faster and the other, 10', slower. In addition to or instead of the application of the disturbance variable via said impulse transmitter 25, it is possible to send one more signal 33 of another impulse transmitter 34, which is connected to said driving shaft 5, to said control units 9, 9'. Depending on the type of the desired control, said impulse transmitter 34 is able to measure the speed or the angle of rotation of said driving shaft 5.

Said driving shaft 5 is connected nonrotatably to said driving shaft 5' via a set of gears 66, 66'. Said two gears 66, 66' have equal number of teeth, so that said driving shafts 5, 5' rotate in opposite directions.

During the operation, said motor 1 rotates at an essentially constant, but uncontrolled speed. As long as said shaft 4 does not rotate, said driving shaft 5 is driven at a step-down ratio that is determined by the diameters of said sun gear 15 of said toothed ring 16 and of planetary gears 17. The drive torque imparts a torque to said shaft 4 and consequently to said worm gear 8 against the direction of rotation of said shaft 3. If said worm 7 is now rotated in such a direction that said shaft 4 will rotate in the direction of the torque acting on it, the speed of said driving shaft 5 is reduced. Because said worm drive 6 is nearly self-locking, only a very low torque is transmitted in the driving direction to said worm 7. Said servomotor 10 acts mainly as a brake. Said control unit 9 regulates the speed of said worm 7 via said servomotor 10 to the nominal value set on said member 32. If the driving torque on said shaft 5 is increased, the torque to be generated by said motor 1 will also increase immediately. Because said motor 1 is not controlled, the speed of said shaft 3 will also decrease as a result. This change is detected by said impulse transmitter 25 and sent to said control unit 9 via said potentiometer 30 and said tap 31, so that said worm 7 will also rotate at a lower speed. This application of the disturbance variable is designed so that the speed of said driving shaft 5 is independent of the value of the driving torque. When said servomotor 10 rotates at such a high speed that said sun gear 15 and said toothed ring 16 have equal circumferential velocities, said shaft 5 will not rotate. If said toothed ring 16 rotates at a higher speed, said shaft 5 rotates in the reverse direction. The gear ratios are designed so that stoppage of said shaft 5 is reached at half the maximum speed of said servomotor 10. Consequently, said shaft 5 has the same maximum speed in both directions of rotation.

When the driving torque acts on said shaft 5 in the opposite direction of rotation, the flux of force extends via said set of gears 67, 65', said second differential 2', and said gear pair 66, 66' to said driving shaft 5. Said two differentials 2, 2' and said two worm drives 6, 6' are of identical design. Said control units 9, 9' and said potentiometers 30, 30' with said taps 31, 31' are connected so that the sum of the speeds of said two servomotors 10, 10' is constant in the entire range of variation. To achieve this, said two potentiometers 30, 30' are connected laterally reversed, so that the sum of the signals on said two taps 31, 31' remains constant. This sum of nominal values can be finely adjusted by adjusting said roller 36 relative to said actuating rod 35.

The drive described permits continuous variation of the speed of said driving shaft 5 in both directions of rotation with both driving and decelerating torque acting on said driving shaft 5. Said drive is suitable, e.g., for elevators with counterweights, robots or as a drive for vehicles. Especially in the case of use in elevators, it is advantageous to design said drive motor 1 and at least one of said servomotors 10, 10' as stopping motors. Such stopping motors have a brake which blocks the motor shaft when the power supply is turned off. On turning off, the speed of said driving shaft 5 is first reduced to zero and said drive motor 1 is turned off, and said control units 9, 9' decelerate said servomotors 10, 10' synchronously with the reduction of the speed of shaft 68, so that said shaft 5 will stand still. Conversely, on turning on, said control units 9, 9' with said servomotors 10, 10' are first put into operation, after which said motor 1 is turned on. Due to the application of the disturbance variable, said servomotors 9, 9' accelerate synchronously with said shaft 3. In order to obtain a broad speed range of said driving shaft 5, the diameters of said worms 7, 7' are at least half the diameters and preferably at least equal to the diameters of said worm gears 8, 8'. A reduction that is unusually small for worm drives is thus achieved. It is thus possible to reach a high speed of said shafts 4, 4' for a given maximum speed of said servomotors 10, 10'. The drive described is highly dynamic, because only the speed of said shafts 4, 4', said worm drives 6, 6', and said servomotors 10, 10', which have relatively small mass moments of inertia, must be changed to change the speed of said shaft 5. Contrary to high-performance servomotors, the accelerating and decelerating capacity can be even further improved here if a flywheel 40 is mounted on said shaft 68.

In the drive described, the torque on said motor shaft 68 is proportional to the torque on said driving shaft 5, independently of its speed. The driving torque can therefore be measured directly by determining the power consumption of said motor 1. This is useful especially in cranes and elevators, as well as robots for overload protection. The efficiency also decreases with decreasing speed of said driving shaft 5. It reaches zero when said driving shaft 5 has stopped. This also happens in high-performance servomotors. Contrary to these, the excess power is not used up by the electric unit for heating, but it causes an increase in the temperature of the transmission fluid. The waste heat can therefore be removed in a simple, reliable, and inexpensive manner, i.e., with an oil cooler. In contrast, the removal of heat from the power electronic system represents a considerable problem, and, among other things, also a safety hazard in the case of continuously variable drives with high-performance servomotors.

To alleviate the requirements in terms of accurate synchronization of said two servomotors 10, 10', one freewheeling mechanism 41, 41' each may be installed in said two input shafts 3, 3', as is indicated in broken line in FIG. 1. As an alternative to this, it is also possible to drive said two input shafts 3, 3' by a separate drive motor 1a, 1b each, in which case said gears 65, 65', and 67 are omitted. Said two motors 1a, 1b rotate continuously in the same direction, and only one of them is loaded, depending on the direction of the torque acting on said driving shaft 5. Said servomotors 10 may also be replaced with electrically, mechanically, pneumatically, or hydraulically controllable brakes.

In the embodiment according to FIG. 2, identical parts are designated by the same reference numerals, so that it is unnecessary to give a detailed description of said gear mechanisms 2, 2' and said worm drives 6, 6'. Said members 10a, 10a' with controllable speed are designed as friction gears here, comprising two parallel, rotatable disks 50, 51; 50', 51', which are radially offset relative to one another, as well as a friction wheel 52, 52'. Said friction wheel 52, 52' rolls on said two disks 50, 51; 50', 51' and is rotatably mounted on a rod 53, 53'. Said rods 53, 53' are oriented perpendicularly to said two shafts 54, 55; 54', 55' of said disks 50, 51; 50', 51'. They are displaceable along their axis by means of a common lifting element 56. Said lifting element 56 acts on a double-armed lever 56a, to whose free ends said two rods 53, 53' are hinged. Said friction gears 10a, 10a' are designed so that at constant speed of said input shaft 3, the sum of speeds of said two shafts 55, 55' is constant, regardless of the lifting movement of said lifting element 56. For adjustment, the length of said rod 53' can be set by means of an adjusting member which is indicated symbolically as a turnbuckle 63 in FIG. 2.

Said disks 50, 50' are connected to said input shafts 3, 3' via a gear 57, 57' each and a toothed belt 58, 58'. Said disks 51 are connected to said shafts 19, 19' of said worms 7, 7' via two bevel gears 59, 60; 59', 60'. The transmission ratio of said friction gears 10a, 10a' can be varied continuously by displacing said rods 53, 53'. In the simplest case, said rods 53, 53' are adjusted manually, and said lifting element 56 comprises, e.g., a crank with a nut, with which engages a threaded rod hinged to said lever 56a. In the case shown, said lifting element 56 is, in contrast, an electrically, hydraulically, or pneumatically actuated actuator which is driven by a control unit 61. Said control unit 61 has a nominal value input 62. The actual value 33 is again sent by a transmitter 34 which measures the angle and/or the angular velocity of said driving shaft 5.

One bevel gear 70, 70' each is mounted on said two input shafts 3, 3'. Said two bevel gears 70, 70' mesh with another, common bevel gear 71. Due to this design, said two input shafts 3, 3' rotate at equal speed but in opposite directions. Said drive motor 1 may also be connected to a bevel gear 71, which is shown in broken line in FIG. 2.

Other, continuously variable gear mechanisms, e.g., variable-speed drives, are also suitable instead of said friction gears 50, 51, 52; 50', 51', 52'.

During operation, the embodiment according to FIG. 2 operates analogously to that shown in FIG. 1. Only a very low power is transmitted via the continuously variable drives 10a, 10a' in this case as well, so that these can be produced easily and inexpensively. Said motor 1 may also be an internal combustion engine or a steam or gas turbine in this case. It may be useful to provide a freewheeling mechanism each in said two input shafts 3, 3', analogously to the embodiment shown in FIG. 1, in the embodiment according to FIG. 2 as well.

The embodiment according to FIG. 3 is analogous to that shown in FIG. 1, and identical parts are again designated by the same reference numerals. The embodiment according to FIG. 3 differs from that shown in FIG. 1 in that only one worm drive 6 and only one servomotor 6 [sic—Tr.Ed.] are present and that said two input shafts 4, 4' are connected to one another via a third differential 80. Said differential 80 is also designed as a planetary drive with a sun gear 81, a toothed ring 82, and planetary gears 83, which are mounted rotatably on a pinion cage 84. Said sun gear 81 is connected with a coaxial gear 85 which meshes with a gear 87 connected to said shaft 4 via an intermediate gear 86. Said toothed ring 82 carries a gear 88 which meshes with a gear 89 mounted on said shaft 4' via another intermediate gear 86. Said pinion cage 84 is rigidly connected to said motor shaft 68. The gear ratios of said differential 80 and of gear sets 85, 87 as well as 88, 89 are selected so that at constant speed of said motor shaft 68, the sum of the speeds of said two input shafts 4, 4' is constant. Freewheeling mechanisms 41, 41' may be installed in both said input shafts 3, 3' in this case as well. Said gears 66, 66' may mesh with each other directly or via an even number of intermediate gears 90, 90'.

The torque is transmitted from said motor shaft either via said differential 2 or via said differential 2', depending on the direction of the driving torque acting on said driving shaft 5 in the embodiment according to FIG. 3 as well. Said worm drive 6 is loaded in the same direction in both cases, and said servomotor 10 acts as a brake at equal direction of rotation in both cases. Accurate synchronization of said two input shafts 4, 4' is achieved with the additional differential 80. In addition, control is simplified.

The embodiment according to FIG. 4 corresponds to the embodiment according to FIG. 2, the difference being that said second member 10a' with variable speed is omitted and replaced with an additional differential 75. Said differential 75 may be designed, e.g., as the rear axle differential of an automobile. The input shaft 76 of said differential 75 is connected nonrotatably to said bevel gear 71. One output shaft 77 is connected rigidly to said bevel gear 59 and the other output shaft 77' is connected to said bevel gear 59'. The sum of speeds of said two worms 7, 7' and consequently of aid two input shafts 4, 4' is constant at constant speed of said drive motor 1 in this embodiment as well.

The embodiment according to FIG. 4 has the advantage over the embodiment according to FIG. 3 that only very small torques have to be transmitted via the additional differential 75 and that this additional differential can therefore be built easily and at low cost. In contrast, the embodiment according to FIG. 3 has the advantage that the second worm drive 6' is also omitted.

Claim:

1. Continuously variable drive comprising a drive motor (1), a first differential (2) with a first and a second input shaft (3, 4) and a first driving shaft (5), a first worm drive (6) with a first worm (7) and a first worm gear (8), as well as a first member (10) with variable speed, wherein the drive motor (1) is connected to the first input shaft (3), the first worm gear is connected to the second input shaft (4), and the first worm (7) is connected to an output shaft (19) of the member (10) with variable speed, characterized in that the drive comprises a second differential (2') with a third and fourth input shafts (3', 4') and a second driving shaft (5'); that the second and fourth input shafts (4,4') are driven so that at constant speed of the first and third input shafts (3, 3'), the sum of speeds of the second and fourth input shafts (4, 4') is constant; and that the first driving shaft (5) is coupled nonrotatably to the second driving shaft (5'); that one of the two differentials (2, 2') transmits a driving torque acting on the first driving shaft (5) in one direction of rotation and the other differential (2', 2) transmits it in the opposite direction of rotation at constant direction of rotation and constant direction of an input torque to the first and third input shafts (3, 3').

2. Drive in accordance with claim 1, characterized in that the first input shaft (3) is coupled nonrotatably to the third input shaft (3').

3. Drive in accordance with claim 1 or 2, characterized in that it additionally comprises a second worm drive (6') with a second worm (7') and a second worm gear (8') connected nonrotatably to the fourth input shaft (4').

4. Drive in accordance with claim 3, characterized in that the second worm (7') is connected to an output shaft (19') of a second member (10') with controllable speed, wherein the two members (10, 10') with controllable speed are controlled so that at constant speed of the first input shaft, the sum of speeds of their output shafts (19, 19') is constant.

5. Drive in accordance with claim 4, characterized in that the sum of speeds of the output shafts (19, 19') is adjustable.

6. Drive in accordance with claim 2, characterized in that the drive motor (1) is connected to a drive shaft of a third differential (80), one driving member (85) of which is connected nonrotatably to the second input shaft (4) and the other driving member (88) of which is connected nonrotatably to the fourth input shaft (4').

7. Drive in accordance with claim 3, characterized in that the drive motor (1) is connected to a drive shaft (76) of a third differential (75), one driving member (77) of which is connected to the first worm (7) and the other driving member (77') of which is connected to the second worm (7').

8. Drive in accordance with one of the claims 1 through 7, characterized in that the member (10) with controllable speed is a servomotor.

9. Drive in accordance with claim 8, characterized in that the drive motor (1) and the servomotor (10) are designed as stopping motors.

10. Drive in accordance with one of the claims 1 through 9, characterized in that a flywheel is coupled to the input shaft (3).

* * * * *